United States Patent [19]

Evans

[11] Patent Number: 4,755,912
[45] Date of Patent: Jul. 5, 1988

[54] METHOD OF PHOTOGRAPHY

[75] Inventor: Edwin C. Evans, Manhasset, N.Y.

[73] Assignee: Gamma One Conversions, Inc., New York, N.Y.

[21] Appl. No.: 51,775

[22] Filed: May 20, 1987

Related U.S. Application Data

[60] Continuation of Ser. No. 762,395, Aug. 5, 1985, abandoned, which is a division of Ser. No. 462,942, Feb. 1, 1983, Pat. No. 4,553,193.

[51] Int. Cl.$^4$ .............................................. G03B 15/02
[52] U.S. Cl. .......................................... 362/3; 362/18; 362/285; 362/419
[58] Field of Search ....................... 362/3, 6, 8, 11, 18, 362/263, 270, 271, 282, 284, 285, 419, 430, 220

[56] References Cited

U.S. PATENT DOCUMENTS 3,378,678  4/1968  Groff ........................................ 362/5
4,383,287  5/1983  Fette ..................................... 362/220

Primary Examiner—Charles J. Myhre
Assistant Examiner—David A. Okonsky
Attorney, Agent, or Firm—Richard Whiting

[57] ABSTRACT

A scanning light source system for projecting onto each area of a complete painting or other planar subject a beam of light and for moving said beam vertically and horizontally. The vertical movements comprise a succession of sweeps across the painting for the purpose of consecutively illuminating each part of the painting sufficiently strongly so that the whole may be photographically reproduced more satisfactorily than has been possible heretofore, i.e. through the use in combination of Kodak #6121 duplicating film or another gamma 1.0 film, polarizing filters, and a lens aperture of f22 or smaller. The horizontal movements position the light source for each vertical sweep. Said system enables a beam of light to be projected onto each part of the entire surface of the subject painting an angle of greater than 40° and less than 80°, thereby enabling brushstroke and texture detail of a painting to be accurately rendered in a photographic reproduction. Said system also provides even illumination over the whole surface of the subject painting.

4 Claims, 3 Drawing Sheets

METHOD OF PHOTOGRAPHY

This is a continuation of copending application Ser. No. 762,395, filed Aug. 5, 1985 now abandoned which was co-pending with, as a divisional of applicaiton Ser. No. 462,942, filed Feb. 1, 1983 now U.S. Pat. No 4,553,193 issued Nov. 12, 1985.

FIELD OF INVENTION

This invention relates to an apparatus for projecting a movable beam of light onto a painting in such a way as to enable a more faithful photographic reproduction of the painting, and in particular of its texture and tonal range, than has been possible heretofore by providing even illumination at a high intensity from a desirable angle.

BACKGROUND OF THE INVENTION

The techniques heretofore utilized for photographing paintings have typically consisted of arrays of an equal number of tungsten lights placed at either side of the subject painting. The principal drawback of this prior art method is its inability to permit the details of a painting's texture to be reproduced. It also renders it difficult for an entire painting to be evenly lit from corner to oorner without laborious setting-up. To reproduce the details of texture it is necessary for the dominant lighting source to be directed from above the painting at the preferred angle of 40°-55° to the perpendicular (FIG. 1) to the painting although satisfactory results may be obtained using other angles up to 80. This is not feasible with prior art methods since multiple array of stationary top lighting will not evenly illuminate a painting; such arrays characteristically produce a fall-off of light towards the bottom of the painting. The use of a light placed below the painting to fill in gaps in top lighting will cause the texture-highlighting benefits of top lighting to be lost.

Further problems with prior art techniques lie in obtaining faithful color reproduction while at the same time using techniques to eliminate glare spots. The film generally used for photographic reproduction of paintings has heretofore been Kodak Ektachrome tungsten film or other color films. A transparency produced using this type of film has a contrast greater than that of the subject painting. A recognized preferred medium for photographing paintings is Kodak #6121 duplicating film (presently the only gamma 1.0 film commercially available) which will faithfully reproduce the contrast and color of a subject painting if used at an exposure of approximately 10 seconds. At greater exposures reciprocity failure occurs in this film resulting in color distortion. However, it has not hitherto been possible to utilize this material for the reason set out below.

In order to obtain enough light to photograph a painting using Kodak #6121 duplicating film (ASA of approximately 7) it would be necessary to use an array of at least six 500 watt tungsten lights. Polarizing filters must be used on each of the lights and on the camera lens in order to eliminate glare spots which will detract from the quality of the photograph, and their use necessitates an exposure increase of 2½ f stops. Thus in order to photograph a painting by conventional techniques using an array of six 500 watt lights with polarizing filters, an exposure of 10 seconds at f8 would be required. With such an exposure, using a 16 inch lens, the length commonly employed in copying paintings, the depth of field would be approximately 3/32 inch. As in practice neither the film plane nor the subject painting is perfectly flat, it is not possible with such a narrow depth of field for the whole area of the painting to be in focus. In order to increase the depth of field to an acceptable amount with the specified lens, it is necessary to use an aperture of f22 or less. In order to do so one would have to use bulbs delivering 24 kilowatts of light. The use of such an array of lights would not be feasible in normal conditions for two major reasons. First, such an array of lights could not be used without specially adapted power circuits, and in any event it would generate an unacceptable amount of heat. Second, if it is assumed that 24 one kilowatt bulbs are used it would be necessary to align 24 polarizing filters—an impractically laborious process.

The scanning light source device which is the subject of this invention solves the foregoing problems. A light source aimed downward at an angle of between 45° and 55° to the horizontal and projecting onto the painting an elongated rectangle of light is moved across the subject painting in precisely planned vertical sweeps in an otherwise darkened environment. Each part of the subject painting is subjected to bright illumination for approximately 10 seconds, the optimum exposure time of Kodak #6121 duplicating film, by light reaching the printing at the desired angle for the reproduction of brush strokes and texture detail. The total time taken to photograph a painting will, of course, vary according to the size of the painting but, for example, a painting 5 feet by 7 feet may be photographed in 14 minutes. Sufficient light is cast onto the painting to enable the use of an f32 lens aperture and polarizing filters. The use of Kodak #6121 duplicating film results in the tonal range and color of the subject painting being faithfully reproduced.

The system further provides for precise timing and spacing of the required number of vertical sweeps of the light source enabling the exact amount of light calculated to be required for optimum photographic quality to be projected onto the subject painting and also making it possible for the entire surface of the planar subject to be evenly illuminated.

It is accordingly the principal object of the present invention to provide a new and improved lighting system for photographing paintings.

Another object of the present invention is to provide a lighting system which will deliver a beam of light at an angle of 40°-55° to the painting or other planar target enabling brush work painting techniques and surface texture to be reproduced in detail heretofore impossible.

Another object of the present invention is to provide a lighting system for photographing paintings which will enable sufficient light to be cast on the painting to be photographically reproduced to enable the entire tonal range of the painting to be recorded using gamma 1.0 film.

Still another object of the invention is to provide an illumination system which will deliver enough light to a painting so that it may be photographed using a lens aperture of f22 or smaller to maximize the ease with which a sharply focused photograph of a painting may be obtained.

Still another object of the invention is to provide a lighting system making it possible to light the entire surface of a painting evenly from corner to corner.

A still further object of the invention is the provision of a system for illuminating paintings to be photographically reproduced which will produce greater amounts of light utilizing significantly less electricity than prior art systems.

DETAILED DESCRIPTION

The current invention will now be described in more detail in connection with a particular embodiment designed for ease of assembly and disassembly.

The embodiment consists fundamentally of two parts: the light assembly, which can move horizontally on its support assembly; and a frame, which includes horizontal support members which can move vertically.

Figure 1:
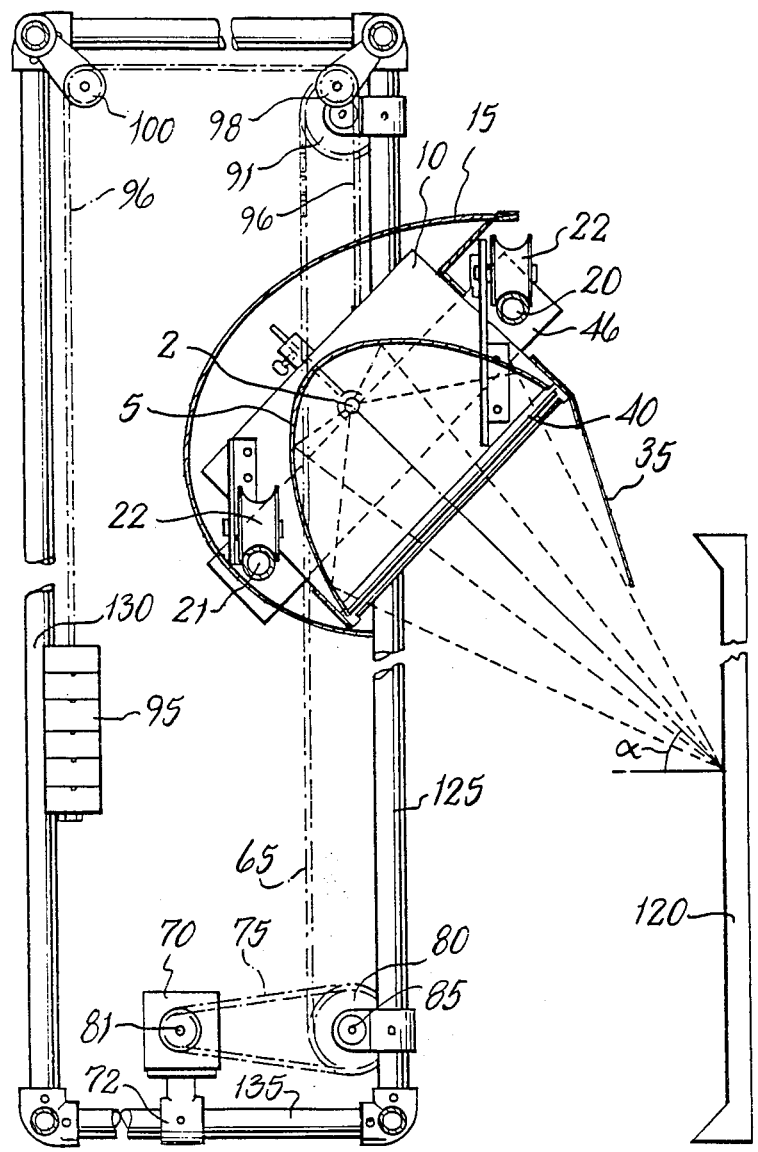
FIG. 1 is a partial cut-away view of an illustrative embodiment of the invention taken along the lines 1—1 in FIG. 2.

The central element of the light assembly, shown in a partial cut-away view in FIG. 1, is light source 2. Light source 2 is a pulsed xenon light ⅜ inch in diameter and 9½ inches in length. It is mounted at one focus of reflector 5 which has, in cross-section, an elliptical shape for reasons described below. The light source 2 and reflector 5 are conveniently mounted in a casing 10 the rear surface of which is covered with a black shield 15 (shown cut away in FIG. 2) or otherwise darkened. Since the plane of movement of the light source 2 is between the camera (not shown) and the painting 120, the shield prevents light from the light source from reaching the camera except as it is reflected off the painting being photographed. A shield 35 is preferably attached to the leading edge of the casing for reasons described below.

The light assembly is connected to horizontal support members 20 and 21 by means of four concave wheels 22 which may travel the length of the supports. At either end of the light 2 on the outside of the casing 10 are small fans 30 and 31 for the purpose of keeping the equipment cool.

A pulsed xenon light source is preferably employed since such a light maintains a constant color temperature irrespective of voltage variations. A tungsten filament tube light source may also be used. Such a light would perform satisfactorily if used in conjunction with a voltage regulator. A voltage regulator would be necessary in order to maintain a constant color temperature irrespective of voltage variation. An advantage in using a tungsten light source with Kodak #6121 duplicating film is that less color filtration would be necessary for color balance since the film is designed primarily for use with tungsten light.

Tungsten and other light bulb units with reflectors built in are well known. It is possible to utilize such bulb units in the apparatus disclosed. While the use of such bulbs would obviate the need for a separate reflector, alignment and focusing might be more difficult.

The invention utilizes the focussing properties of the ellipse to generate an intense light beam of the desired shape. It will be recalled that rays emanating from one focus of an ellipse will be reflected off the ellipse at angles such that they all converge at the second focus of the ellipse. In the light assembly of the present invention as seen in cross-section, the light source 2 is mounted between 1½ inches and 2½ inches from the surface of the elliptical reflector 5 (as measured along the major axis of the ellipse) at one focus of the ellipse, and the reflector is sized so that the second focus of the ellipse is 24 inches from the location of the light source. The light source-to-painting distance, correspondingly, is chosen to be approximately 24 inches with the result that the light rays from light source 2 are nearly but not precisely focussed on the painting surface forming an elongated rectangle.

The preferred light source-to-reflector distance for the pulsed xenon light is 2 inches. This has been reached by experimentation using a variety of distances and represents a compromise resulting from the fact that while placing the light source 2 closer to the reflector maximizes the illumination delivered, it also results in a less sharply focused beam being obtained. The use of a 2 inch light source-to-reflector distance also results in the elliptical section of the reflector being a relatively deep and narrow shape which is the preferred reflector shape since it maximizes the amount of reflected light reaching the painting 120.

The rear of the reflector casing is covered with a black shield 15 to render it invisible to the camera when a painting is photographed. Since the plane of movement of the light source 2 is between the camera (not shown) and the subject painting 120 said shield prevents light from the light source 2 reaching the camera except as reflected off the subject painting.

When the lower portions of the painting are being illuminated and photographed, the casing 15 masks from the camera light above the focused beam consisting of unreflected light coming direct from the light source. The amount of such light is a factor of parallax varying with the camera position. The shield 35 performs the same function for the upper portions of the painting. It is desirable to eliminate this light since much of it strikes the painting at an angle of less than 40°.

A filter pack 40 is placed in front of the light source. This pack consists of six elements arranged in the following order: infra-red and heat absorbing filter (nearest to the light source; heat reflecting glass; ultra-violet absorbing filter; polarizing filter; color filters as appropriate and pyrex: The ultra-violet absorbing filter is used to prevent color distortion from the ultra-violet end of the spectrum. The infra-red filter performs the dual functions of eliminating far red light (which is of particular importance when Kodak #6121 duplicating film is used since this film has a high red sensitivity extending to a wavelength of 680 nanometers) and second, of decreasing the amount of heat from the light source 2 which reaches the painting. The primary heat reducing function, however, is carried out by the heat absorbing glass and the heat reflecting glass. The polarizing filter is, it will be appreciated, for the reduction of glare spots. Color filtration is necessary in order to produce accurate color rendition. The necessary filtration is not the same for each batch of Kodak #6121. The correct filter usage must be established by testing against a color chart for each emulsion batch number.

Figure 4:
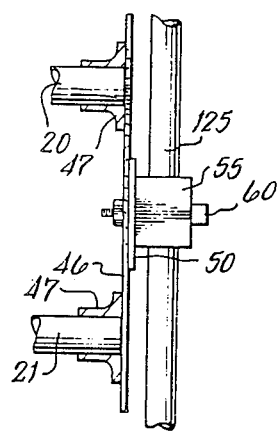
FIG. 4 is a fragmentary rear elevational view on an enlarged scale of the center right hand position of FIG. 2.
Figure 5:
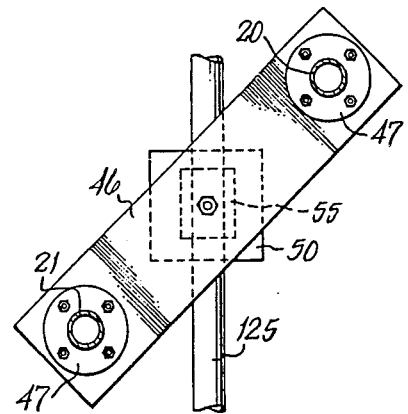
FIG. 5 is a side elevational view of FIG. 4.

The light assembly just described is connected to a light support assembly capable of controlled vertical movement. As may be seen in FIGS. 4 and 5 the horizontal support tubes 20 and 21 are attached at either end, by means of a bracket 47, to a metal plate 46 which in turn is attached to a second plate 50 which is bolted onto a casing containing a ball bushing bearing 55 such as a Thomson Ball Bushing which has threaded through a lug 60 attached thereto a vertical driving chain 65. FIG. 4 shows this at one end. The other end is a mirror image but for the omission of the motor 105. In the remainder of the apparatus shown in FIGS. 1, 2, 3 and 5 the left and right sides of the assembly are also mirror images since even vertical movement is desired. The vertical drive chain 65 is driven by a single speed vertical drive motor 70 (FIG. 1). The motor 70 is attached to the tube 135 by means of a bracket 72 and has connected to it a direct drive chain 75 which is threaded around sprocket drives 80 and 81. Sprocket drive 80 is attached to a drive shaft 85. Vertical movement of the entire light support assembly is obtained via the chain 65 and the sprocket drives 90 and 91. The upper horizontal drive shaft 92 primarily serves a stabilization and support function.

The vertical drive motors at either side of the apparatus are synchronized to ensure that the light source remains horizontal. This synchronization is aided by the incorporation into the apparatus of counter-balance weights 95. The weights are attached to the plate 46 via a cord 96 which passes over pulleys 98 and 100.

Figure 2:
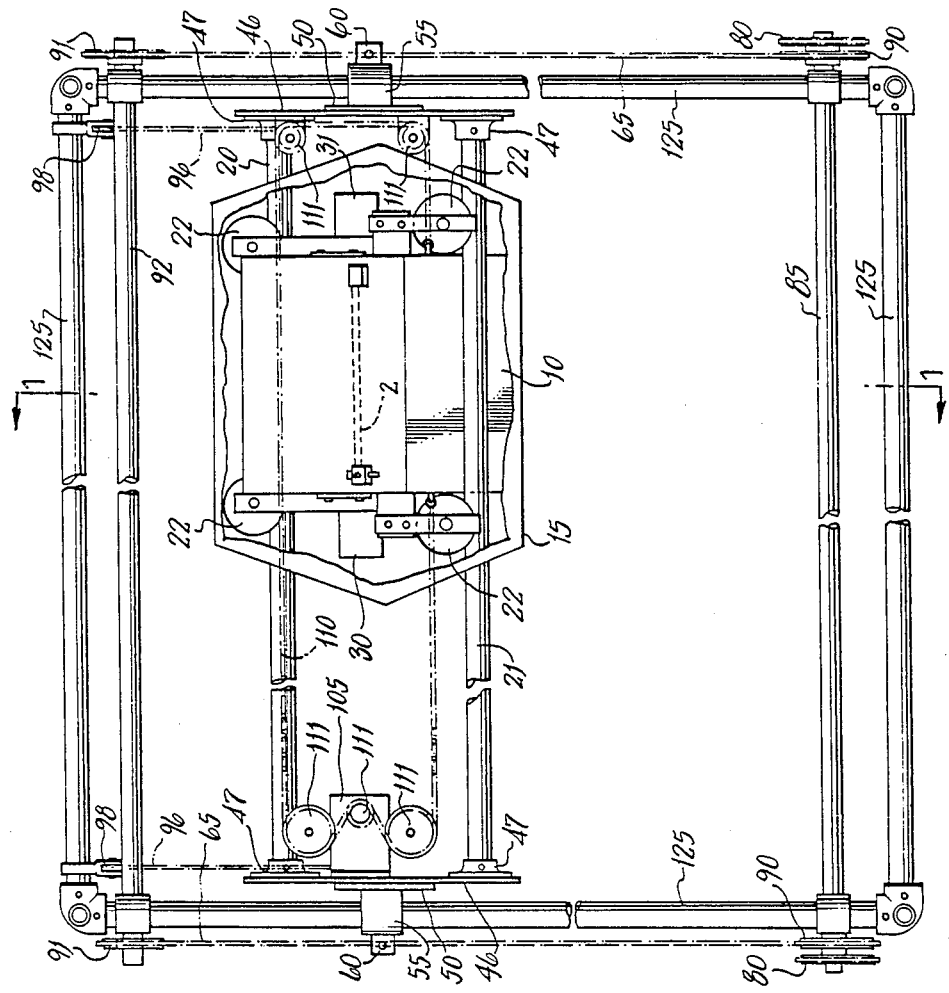
FIG. 2 is a rear elevational view of an illustrative embodiment of the invention, with the shield shown cut away.
Figure 3:
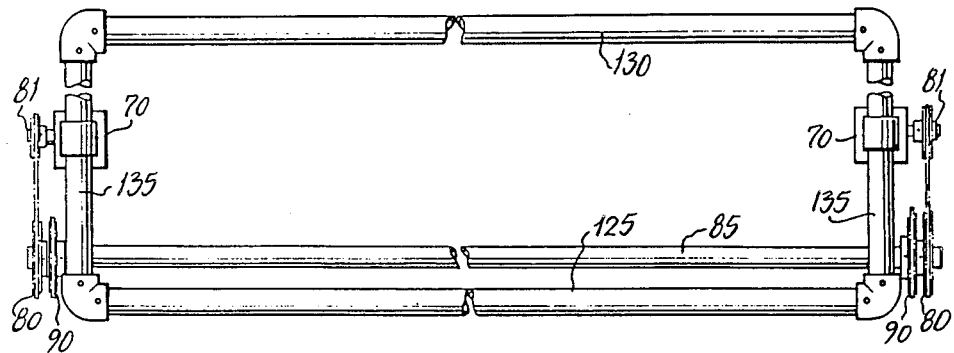
FIG. 3 is a bottom view of an illustrative embodiment of the invention.

Horizontal movement of the light assembly is governed, as shown in FIG. 2, by a horizontal drive motor 105 attached to plate 46 which drives a bead chain loop 110 threaded around sprocket drives 111 attached to the metal casing 10.

The motors 70 and 105 are electrically powered. Electricity is delivered to each motor through a separate timing device (such as the Gralab 500 Enlarger Timer) which is set in advance. The motors are set to operate alternately to produce vertical and horizontal movement in a serpentine pattern. The power source for the light 2 is attached to the same timer as that for the vertical motor 70. The light is turned on at the commencement of each vertical sweep, and off at the beginning of each horizontal sweep, remaining off during the horizontal movement phase. The total amount of light reaching the painting is therefore governed by the spacing of the vertical sweeps. With the one-speed vertical motor 70 and the one-speed horizontal 105 employed in the preferred embodiment a typical vertical scan for a painting 2 feet in height is 17 seconds with 3 seconds of horizontal movement during which the light is off.

It is desirable that the light source and movement control apparatus be supported upon a frame which may be readily assembled and disassembled, in order to ensure maximum portability. The support framework used may be of any convenient size and material which combines the requisites of stability and portability. An embodiment which has been found suitable is a frame consisting of a front 125 and a rear 130 rectangular section each measuring 12 feet by 12 feet and constructed from 6 foot lengths of Alcoa seamless 1 inch aluminum tubing of 0.125 inch wall thickness. Said front and rear sections are connected at top and bottom by a 3 foot length 135 of the same type of tubing. Apparatus of such a size enables the illumination of a painting up to 9 feet 6 inches square.

The horizontal tubes which directly support the light source contained in its casing are attached to the anterior vertical tube by being bolted onto the plate 46. Plate 46 is connected to the metal sheet 50 in such a manner as to ensure that the angle a shown in FIG. 1, representing the angle at which the light is directed onto the painting 120, is 40°-55°. The two plates are bolted together in such a way that the angle between them may be readily changed.

What is claimed is:

1. The method of photographing a work of reflective art such as a painting or the like having a planar surface which presents color, contrast and texture to be reproduced, comprising the steps of:

exposing to the planar surface of the work a film having a gamma rating of substantially 1.0 for reproduction of the color and contrast displayed by the artwork, directing at successive small areas of the planar surface of the work a light moving from one area to the next from a source maintained at a constant distance from the planar surface during said movemnet to traverse the entire planar surface with moving light of a constant intensity appropraite for desired film exposure, while maintaining in darkness all areas of said planar surface facing the camera other than the successive small areas at which the light is successively directed, and reproducing the texture of the artwork by directing the light toward the art at an inclination of a predetermined angle to a perpendicular to the illuminated area of said planar surface whereby to cast shadows and cause the texture to stand out in relief.

2. The method of producing a photographic transparency of a work of reflective art such as a painting or the like which has a planar surface presenting color, contrast and texture to be reproduced, comprising the steps of:

exposing to the planar surface of the work a film having a gamma rating of substantially 1.0 for reproduction of the color and contrast displayed by the artwork, directing toward the art a patch of light from a scanning light source aimed downwardly toward the bottom of the artwork at an angle greater than 40° and less than 80° to a perpendicular to the illuminated area of the planar surface to reproduce texture, and moving the patch vertically to traverse the art in precise upward and downward sweeps, said light source moving at a constant speed, at a constant distance from the art and at a constant angle thereto with a constant output for even illumination of appropriate intensity over the entire art surface regardless of its dimensions.

3. The method of photographing a work of reflective art such as a painting or the like which has a planar surface presenting color, contrast and texture to be reproduced, comprising the steps of:

movably directing light from a single source to expose to light only a part of the planar surface to illuminate the same and leave other parts thereof unexposed to light and thereby dark while filtering the light adjacent the source for polarization to inhibit glare and for color filtration, exposing film of substantially gamma 1.0 to the planar surface through a lens and a camera aperture while polarizing the light adjacent the lens, continuing said light movement to scan and thereby sequentially illuminate the entire planar surface, while directing the light from the source to the art at an inclination toward the bottom of the art and at an angle of more than 40° and less than 80° to a perpendicular to the plane of said art at its illuminated part and maintianing said angle of inclination throughout said scanning movement of the light source whereby to reproduce brush strokes and other textural detail of the art.

4. The method of photographing a work of reflective art such as a painting or the like which has a planar surface of predetermined dimensions as to its height and breadth and presents color, contrast and texture to be reproduced, comprising the steps of:

exposing to the planar surface of the work a film having a gamma rating of substantially 1.0 for reproduction of the color and contrast displayed by the artwork, lighting the art by casting on its surface from a light source a single patch of light smaller in its dimensions than the height and breadth of the art and moving the light source upwardly, laterally and downwardly to illumiante the art throughout its entire height and breadth with light of an intensity appropriate for desired film exposure, while maintaining in darkness all areas of the said planar surface facing the camera other than the successive patch areas toward which the light is successively directed, and reproducing the texture of the artwork by directing the light toward the art at an inclination of a predetermined angle between 40° and 80° to a perpendicular to the illuminated area of said planar surface whereby to cast shadows and cause the texture to stand out in relief.

* * * * *

UNITED STATES PATENT AND TRADEMARK OFFICE
CERTIFICATE OF CORRECTION

PATENT NO. : 4,755,912
DATED : July 5, 1988
INVENTOR(S) : Edwin C. Evans

It is certified that error appears in the above-identified patent and that said Letters Patent are hereby corrected as shown below: Title page:

Abstract, Line 15, after "painting" insert -- at --.

Col. 1, Line 33, change "array" to -- arrays --.

Col. 2, Line 27, change "printing" to -- painting --.

Col. 6, Line 19, change "movemnent" to -- movement --.

Col. 7, Line 5, change "maintianing" to -- maintaining --.

Signed and Sealed this

Twentieth Day of December, 1988

*Attest:*

DONALD J. QUIGG

*Attesting Officer*     *Commissioner of Patents and Trademarks*